Dec. 14, 1954     W. S. PEARSON     2,696,799
SWABBING FLUID RESTRICTOR
Filed Oct. 5, 1950
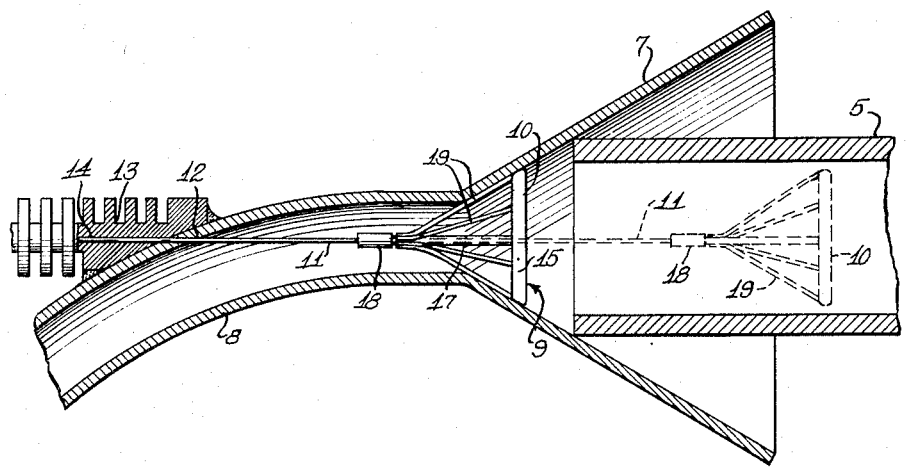
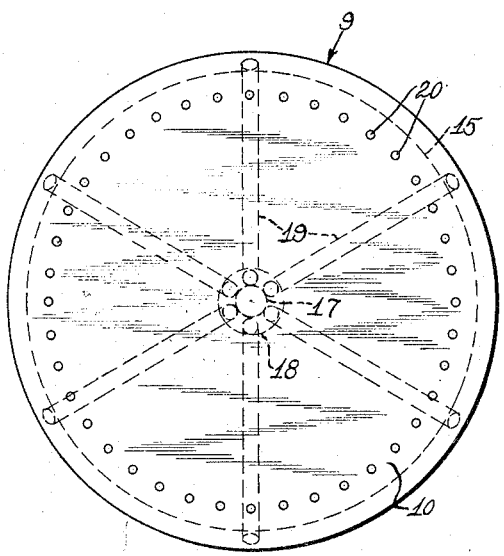
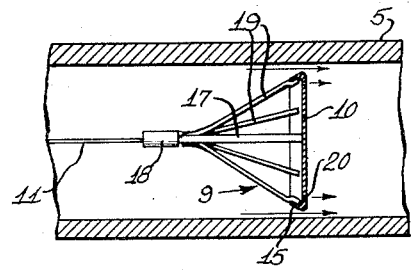
Inventor
William S. Pearson
by The Firm of Charles W. Hills Attys

United States Patent Office 2,696,799
Patented Dec. 14, 1954

2,696,799

SWABBING FLUID RESTRICTOR

William S. Pearson, Baltimore, Md., assignor to Clifton Conduit Company, Inc., Baltimore, Md., a corporation of Maryland Application October 5, 1950, Serial No. 188,621

5 Claims. (Cl. 118—63)

The present invention relates to improvements in devices for use in controlling hot swabbing fluid during internal swabbing of freshly galvanized pipe, and more particularly concerns a device which is particularly useful in larger sizes.

In my copending application for patent Serial No. 91,584, filed May 5, 1949, and now Patent No. 2,669,217, there is disclosed a novel apparatus for removing excess galvanizing metal in molten condition from the interior of larger sizes of freshly galvanized conduit or pipe running upwards from about one inch in diameter. Among other things, said application includes a disclosure of a swabbing control member by which a blast or shot of swabbing fluid such as super-heated steam introduced into one end of the freshly galvanized pipe is controlled to sweep the inner surface of the pipe in a high velocity annular layer traveling progressively down the length of the pipe. The controlling device thus disclosed comprises a cone-shaped member attached to the end of a control cable.

It has been found that the cone-shaped form is satisfactory up to a certain size but for very large sizes such as up to four inch internal diameter tubing or pipe the deflector or control cone shape becomes too heavy by reason of the mass of material used in its construction, so that the cone tends to gravitate against the internal wall of the tubing and thus damage the freshly galvanized coating thereon.

Accordingly, it is an important object of the present invention to provide an improved swabbing fluid controlling device for use in restricting to a limited swabbing path and accelerating the velocity of the swabbing fluid within the largest sizes of freshly galvanized sections of conduit or pipe being swabbed with heated swabbing fluid.

Another object of the invention is to provide an internal swabbing fluid restrictor device of the kind which is controlled to travel down the interior of a freshly galvanized pipe section to be swabbed and which device is especially adapted for use with the largest sizes of galvanized pipe.

A further object of the invention is to provide an internal swabbing fluid restricting and controlling member which is of very sturdy construction but of unusually light weight in proportion to size.

Still another object of the invention is to provide an internal swabbing controlling and restrictor member which is efficiently responsive to fluid pressure acting to maintain the same centered within and out of contact with the internal wall of a freshly galvanized pipe section being internally swabbed and with the device in use during the swabbing.

Other objects, features and advantages of the present invention will be readily apparent from the following detailed description of a preferred embodiment thereof taken in conjunction with the accompanying drawings, in which:

Figure 1 is a longitudinal sectional view through a blow tube and pipe section to be internally swabbed, showing a device according to the present invention in elevation;

Figure 2 is a longitudinal sectional view through the pipe section and through the swabbing fluid controlling member, showing the controlling member in operative position internally of the pipe section; and Figure 3 is an enlarged face elevational view of the swabbing fluid restrictor and controlling device.

In swabbing the interior of a section of tubing or pipe 5 which has been freshly galvanized and is still in a heated condition so that the molten zinc is still in a fluent condition and therefore flowable in response to fluid pressure thereagainst, an end of the pipe 5 is pressed in centered relation into a bell mouth 7 of a blow tube 8. Heated swabbing fluid such as superheated steam is then ejected from the blow tube 8 and driven down the passage within the pipe 5 for driving excess galvanizing fluid down the pipe passage and expelling the same from the opposite end of the pipe section.

In order to avoid the use of excessive swabbing fluid volume and pressure, the passage within the pipe section being swabbed is restricted to leave only a narrow annular area adjacent the inner surface of the pipe for passage of the swabbing fluid at an accelerated speed in swabbing engagement with the internal pipe surface. For this purpose, a swabbing fluid controlling member 9 in the form of a partial plug or restrictor is disposed to be driven down the passage within the pipe section 5 under the impulsion of the swabbing fluid delivered into the proximate end of the pipe section by the blow tube 8. The construction and relationship of the restrictor member 9 to the interior passage of the pipe 5 is such that restraint upon the principal volume of the swabbing fluid is imposed sufficiently to encourage the escape of an annular layer of the swabbing fluid under accelerated speed uniformly in swabbing relation to the internal wall of the pipe section. In the present instance this is effected by providing the restrictor member 9 with a head 10 of a diameter which is slightly less than the internal diameter of the pipe section 5. The member 9 is held captive at the end of a thin flexible leash 11 in the form of an appropriate cable or wire by which restraint upon free movement of the restrictor member 9 in advance of the swabbing fluid is imposed to a sufficient extent to maintain the swabbing fluid behind the restrictor member under such pressure as to encourage the escape of the annular layer of swabbing fluid past the head 10 to maintain the restrictor 9 centered within the pipe and out of contact with the internal wall thereof, while nevertheless permitting the restrictor to travel down the pipe passage at a substantial speed as impelled by the swabbing fluid. The leash member 11 extends through an appropriate passage 12 at the back of the neck of the blow tube 8 concentric with the mouth of the blow tube. A tubular radiator 13 is carried by the neck of the blow tube and has a passage 14 therein aligned with the passage 12 and through which the leash 11 extends in heat transfer relation whereby to dissipate the heat transferred to the leash by the superheated steam in operation.

In order to avoid gravitational displacement of the restrictor member 9 in operation and consequent marring of the internal surface of the pipe 5 being swabbed, the restrictor must be constructed as light as practicable and yet it must be strong enough to withstand the relatively high pressure to which it is subjected by the swabbing fluid. To this end, the head 10 of the restrictor is preferably made from sheet material, such as sheet metal of as thin gauge as practicable and which may comprise a circular stamping of the sheet metal provided with a rearwardly turned annular reinforcing flange 15. Not only is the flange 15 turned rearwardly but it is also directed inwardly so that in cross section it extends at an acute angle to the body portion of the restrictor, as best seen in Fig. 2. Thereby, the perimeter of the resistor is equipped with a quite rigid shoulder.

For attachment of the head 10 to the leash cable 11, an axial stem is attached fixedly as by brazing or welding or otherwise to the inner side of the head 10 and may be in the form of a rod 17 of suitable gauge and length. A suitable coupling device 18 is carried by the distal end portion of the stem 17 for detachably securing the stem to the end of the leash.

Further reinforcement of the member 9 is provided by a series of stays 19 which are secured equidistantly spaced at the inner side of the marginal reinforcing flange 15 and extend generally in the frusto-conical plane of the flange to and are secured at their opposite ends fixedly to the stem 17 adjacent to the coupling 18. The stays 19 may be made from appropriate gauge wire of adequate stiffness. Through this arrangement all parts of the restrictor member 9, including the head 10, the stem 17 and the stays 19 are rigidly secured into a light weight durable unit.

In a typical restrictor embodying the construction of the present invention and adapted for use within freshly galvanized pipe of four inch internal diameter, the head 10 of the restrictor has been constructed of 16 gauge sheet steel, while the stem 17 has been made from quarter inch iron pipe welded onto the head 10, and the stays 19 have been made from eighth inch steel wire. The diameter of the head 10 for this purpose has been three and seven eighth inches, so that in use a one sixteenth inch wide annular space has been present between the perimeter of the head 10 and the internal wall of the pipe section 5 being swabbed.

In service, the leash 11 draws the restrictor 9 rearwardly into the throat of the bell mouth 7, and the angularity of the stays 9 and the flange 15 are substantially complementary to the bell mouth throat so that the flange 15 is drawn into substantially sealing engagement with the throat, and of course centered therein. Upon the delivery of a blast of swabbing fluid by the blow tube 8 behind the restrictor 9, the latter is unseated and driven into the passage within the pipe section 5 to be swabbed. The force of the swabbing fluid is impressed within the generally cup-shaped head 10 of the restrictor device which causes the device to strain against the leash 11 and as the leash is paid out the restrictor travels down the tube. All the while, a narrow annular accelerated stream acting with substantially venturi velocity escapes past the perimeter of the head 10 and effects an efficient fluid wiping action on the surrounding wall of the pipe section 5 to drive excess molten spelter forwardly in advance of the restrictor 9 until the excess spelter is ejected from the distal end of the pipe.

Not only does the flange 15 about the perimeter of the head 10 serve as a venturi baffle for directing the swabbing fluid such as super-heated steam toward the surrounding wall of the pipe, but the flange also functions in cooperation with the swabbing fluid to maintain the restrictor disk centered in the pipe by receiving the pressure of the fluid uniformly generally radially inwardly and forwardly thereagainst. Eccentric displacement of the restrictor member 9 into engagement with the internal wall of the pipe being swabbed is thereby avoided and marring of the uniform zinc coating at the inside of the pipe is thus prevented. The high pressure of the super-heated steam acting upon the beveled or diagonal marginal flange shoulder provided by the flange 15 acts in much the same manner as the camber of an airplane sustains it in flight to force the restrictor to remain virtually solidly centered in the pipe during operation.

In order to avoid backing against the forward face of the head 10 of the restrictor of the excess galvanizing material being driven down the pipe in front of the restrictor 9, a uniform series of small jet holes 20 is provided in the head 10 adjacent to its perimeter so that high velocity streams of swabbing fluid will be emitted therethrough and overlap to provide an annular protective or shielding stream of the fluid which will drive the excess galvanizing material forwardly away from the face of the head 10. As best seen in Fig. 2, as indicated by the directional arrows, the protective or shielding jets and the stream provided thereby in front of the head 10 will extend substantially parallel to and spaced inwardly from the high velocity annular swabbing stream escaping past the perimeter of the head 10. As a result the excess galvanizing material will be substantially prevented from backing against the front face of the head 10 and accumulating thereon or weighting the same down. On the other hand, since the holes 20 are quite small in proportion to the total area of the head 10, they do not substantially dissipate the force of the swabbing fluid behind the head.

It will be understood that modifications and variations may be effected without departing from the scope of the novel concepts of the present invention.

I claim as my invention:

1. In combination in a restrictor member of the character described, a circular head structure of relatively thin sheet material having its margin turned rearwardly and diagonally inwardly to provide a uniform reinforcing and fluid passage baffle flange, a stem projecting from the radial center of the face of the head which is circumscribed by said flange, and a plurality of diagonal stays secured to the inner surface of said flange and to said stem.

2. In combination in a pressure fluid restraining restrictor of the character described, a sheet metal head plate of circular outline having a uniform marginal rearwardly turned reinforcing flange directed diagonally toward the axis of the head plate and providing a rigid perimeter shoulder on the head plate, a rigid stem fixedly secured to the radial center of the head plate and projecting rearwardly substantially therebeyond, a plurality of equidistantly spaced diagonal wire stays fixedly secured to said flange and to said stem, and a detachable coupling device carried by the distal end of the stem for attaching the same to a leash.

3. In combination in a pressure fluid restraining restrictor of the character described, a sheet metal head plate of circular outline having a marginal rearwardly turned reinforcing flange directed diagonally toward the axis of the head plate and providing a rigid perimeter shoulder on the head plate, a rigid stem fixedly secured to the radial center of the head plate and projecting rearwardly substantially therebeyond, and a plurality of equidistantly spaced diagonal wire stays fixedly secured to said flange and to said stem, said stays permitting free access of pressure fluid against the rear side of the head plate, said head plate having a closely spaced series of small jet apertures in annular series therein adjacent to said perimeter shoulder adapted to provide for issuance from the front of the head plate of overlapping streams of high velocity pressure fluid working therethrough from the rear of the head plate.

4. An internal swabbing fluid restrictor for use in internally swabbing freshly galvanized pipe, a circular thin sheet material disk head, a stem extending rearwardly from the radial center of said head, means at the distal end of the stem for securing the same to a leash, the margin of said disk head being provided with a uniform annular flange turned frusto-conically rearwardly and inwardly toward the axis of the disk head, and a plurality of uniformly spaced stays extending divergently from a portion of said stem adjacent to said securing means into fixed relation to said flange and with the outer sides of the stays in line with the external conical surface of the flange.

5. An internal swabbing fluid restrictor for use on the end of a leash and which is adapted to be impelled under restraint of the leash by force of high pressure gas serving as swabbing fluid for removing excess coating material from the interior of freshly coated pipe, a circular thin disk comprising the entire body of the restrictor and providing a front face and a rear face, the perimeter of the disk body having thereon a uniform rearwardly and inwardly directed flange structure sloping uniformly toward the axis of the disk to serve as a venturi baffle for directing the gas toward the surrounding wall of a pipe being swabbed while at the same time receiving the pressure of the fluid uniformly generally radially inwardly and forwardly thereagainst to hold the disk centered in the pipe, and means attached to the disk and extending rearwardly therefrom for connection of the disk to a leash.

References Cited in the file of this patent

UNITED STATES PATENTS

| Number | Name | Date |
| --- | --- | --- |
| 227,398 | Williams | May 11, 1880 |
| 330,443 | Vanduzen | Nov. 17, 1885 |
| 577,647 | Comstock | Feb. 23, 1897 |
| 944,710 | Whitney | Dec. 28, 1909 |
| 956,668 | Becker | May 3, 1910 |
| 1,814,752 | Griffin | July 14, 1931 |
| 1,851,435 | Jessup | Mar. 29, 1932 |
| 2,263,774 | Heltzel et al. | Nov. 25, 1941 |
| 2,275,190 | Lowry | Mar. 3, 1942 |
| 2,484,267 | Bower | Oct. 11, 1949 |

FOREIGN PATENTS

| Number | Country | Date |
| --- | --- | --- |
| 20,532 | Great Britain | A. D. 1896 |